United States Patent [19]

Schotten

[11] 4,289,622

[45] Sep. 15, 1981

[54] PLATE FILTER PRESS WITH FILTER CLOTH TRANSPORT

[75] Inventor: Alfons Schotten, Düren, Fed. Rep. of Germany

[73] Assignee: Eberhard Hoesch & Söhne GmbH & Co., Düren, Fed. Rep. of Germany

[21] Appl. No.: 103,218

[22] Filed: Dec. 13, 1979

[30] Foreign Application Priority Data

Dec. 14, 1978 [DE] Fed. Rep. of Germany ....... 2853952

[51] Int. Cl.$^3$ ............................................. B01D 25/32
[52] U.S. Cl. ................................................. 210/225
[58] Field of Search ....................... 210/224, 225, 228; 100/115

[56] References Cited

U.S. PATENT DOCUMENTS

| | | | |
|---|---|---|---|
| 3,613,563 | 10/1971 | Sumskaya et al. | 210/225 |
| 3,647,082 | 3/1972 | Ishigaki | 210/225 |
| 3,655,055 | 4/1972 | Von Egdom et al. | 210/225 |
| 3,690,462 | 9/1972 | Kurita | 210/225 |
| 3,695,440 | 10/1972 | Mori | 210/225 |
| 3,696,930 | 10/1972 | Tokura | 210/225 |
| 3,698,557 | 10/1972 | Ishigaki | 210/225 |
| 3,807,567 | 4/1974 | Iwatani | 210/225 |
| 3,968,039 | 7/1976 | Inujima | 210/225 |
| 4,155,830 | 5/1979 | Sukhobrusov et al. | 210/225 |
| 4,169,056 | 9/1979 | Sakuma | 210/225 |

FOREIGN PATENT DOCUMENTS

131933 11/1901 Fed. Rep. of Germany .
52-29675 3/1977 Japan ................................. 210/225

*Primary Examiner*—Theodore A. Granger
*Attorney, Agent, or Firm*—Spencer & Kaye

[57] ABSTRACT

A filter press includes a plurality of filter elements (filter plates and filter frames) supported in the press stand for displacement along the length of the press. A guide roller is supported on each filter element alternatingly at opposite sides thereof. A continuous filter cloth is trained about each guide roller for guiding the filter cloth in a zigzag course between all adjoining filter elements. At least some of the guide rollers are directly driven by a driving mechanism. The driving mechanism has a sprocket drivingly connected with each driven guide roller and having a rotary axis in alignment with the rotary axis of the associated driven guide roller and a guide wheel mounted on each filter element which supports a driven guide roller. Each guide wheel has a rotary axis spaced parallel from the rotary axis of the respective sprocket. The driving mechanism further has an endless flexible drive member meshing in succession with each sprocket and being deflected by the respective guide wheels between every adjoining sprocket, whereby the flexible drive member has a zigzag course.

13 Claims, 13 Drawing Figures

PLATE FILTER PRESS WITH FILTER CLOTH TRANSPORT

BACKGROUND OF THE INVENTION

The present invention relates to a filter press having a purality of filter elements which are vertically oriented and mounted to be horizontally displaceable in a press stand, a plate-shaped filter element alternating with a frame-shaped filter element. By means of a closing device, the filter elements can be pushed and pressed together into a plate stack between a head plate and an end plate. Guide rollers around which is guided an endless filter cloth moving between the filter elements in a zigzag pattern are provided at the upper and lower edges of the filter elements. A drive is provided to pull through the filter cloth when the plate stack is open and spacer elements are provided between the individual filter plates.

A filter press of the above-mentioned type is known from U.S. Pat. No. 643,022. This prior art structure, aside from some structural flaws, cannot be adapted to large filter presses with high throughput and cannot be used for automatic operation.

SUMMARY OF THE INVENTION

It is an object of the invention, based on the prior art structure, to provide a filter press which even in large filter presses, permits the filter cloth to be pulled through without malfunction and provides for a rapid and automatic ejection of the filter cake.

This object and others to become apparent as the specification progresses, are accomplished by the invention, according to which, briefly stated, the guide rollers are arranged at successive filter elements, alternating at their upper and lower edges, and at least part of the upper guide rollers are driven rollers. With this measure it is possible, even in larger filter presses comprising 20 or more filter elements, to pull the filter cloth through between the filter plates without stresses or damage when the press is open, since the drives need overcome only the friction forces acting on the filter cloth between two driven guide rollers. It is particularly advantageous to provide that all upper guide rollers are driven.

While it is possible in principle to provide each of the driven guide rollers with its own drive motor, a preferred embodiment provides that at least one end of the driven guide rollers is provided with an entrainment member (hereafter gripper) which engages in a drive means that connects the grippers of a plurality of guide rollers and is in communication with a drive motor. Although in this arrangement the drive motor must be much more powerful than one for individual drives, the advantage of this arrangement is that the required synchronism of the driven guide roller can be effected by means of the common drive means. A further advantage is that in the treatment of corrosive media, the vapors escaping from the filter press, when it is opened, cannot destroy the drive since the sensitive drive motor can be arranged in an area which lies outside the zone endangered by the corrosive vapors while the grippers and the drive means connected thereto can be made of corrosion resistant materials.

According to an advantageous further embodiment of the invention, the grippers are toothed wheels and the drive means is a toothed belt. The toothed wheels as well as the toothed belt are commercially available components and are made of highly wear and corrosion resistant materials.

Regarding the structural design of the drive formed by the drive motor, the drive means and the grippers, it is of significance that when the filter plate stack is opened (whereby beginning with the end plate, the individual filter plates, which are connected together by means of spacer elements, are separated one after the other in an accordion-like manner), no positive forces act on the driven guide rollers, i.e. no external torque must be applied to the guide rollers. For this reason, either the drive means connecting the individual grippers must be able to be uncoupled from the guide rollers or idling couplings must be provided between the individual grippers and their guide rollers. This solution, however, is relatively expensive. Therefore, according to a preferred embodiment of the invention, with each gripper there is associated a belt deflecting mounted on the same filter element in axially parallel orientation with the respective gripper. This arrangement has the advantage that the guide wheel causes the toothed belt to move through the individual grippers in a zigzag pattern. Since the space available between each two guide rollers is determined by the thickness of the filter elements and thus the diameters of the guide rollers as well as the grippers are limited, the guide wheels for the toothed belt must each be disposed somewhat below and offset to the side of the associated guide roller. Consequently, the guide wheel has to be pushed somewhat below the toothed gripper wheel of the adjacent guide roller when the filter plate stack is pushed together. Thus, in the closed state, the angle of enclosure for the toothed belt on the guide wheel is more than 180°. Since the guide wheel pushes itself underneath the toothed gripper wheel by a certain degree, when the filter press is in the pushed-together state, the loop angle on the toothed gripper wheel is also more than 180°.

If now during opening, the filter plates are spread apart with the aid of the closing device to the distance given by the spacer elements, the loop angles of the toothed belt on the guide wheel and on the toothed gripper wheel decrease, i.e. the toothed belt is "unwound" from both wheels. In practice, this "unwound" length of the toothed wheel corresponds to the required width between two guide rollers given by the spacer elements so that during the opening process no torque is applied to the guide rollers. This assures, in a simple manner, an equalization of length for the opening and closing process without requiring complicated coupling devices or the like for this purpose.

According to another advantageous embodiment of the invention, the drive motor for the toothed belt is mounted on the end plate and a guide wheel for the toothed belt is displaceably mounted at the head plate and is provided with a tensioning means. This design provides an equalization of length for that side of the toothed belt which is not in engagement with the grippers of the guide rollers. When the plate stack is closed, the tensioning means moves the guide wheel downwardly on the head plate, while during opening of the plate stack the guide wheel is pulled upwardly against the force of the tensioning means.

According to another advantageous embodiment of the invention, the spacer elements which are fastened at the side of the filter elements connect the individual filter elements together in a chain-like manner. The spacer elements are arranged in a row to both sides of the plate stack in the area of the upper edge as well as of the lower edge. When seen in the longitudinal direction of a row of spacer elements, a spacer element with a long stroke follows a spacer element with a short stroke and the sequence of the different spacer elements in the upper row is offset by one filter element with respect to the spacer elements of the lower row. While in the closed plate stack the individual filter elements are oriented parallel to one another, by virtue of this design during opening only the plate-shaped filter elements remain vertically aligned while the respective frame-shaped filter elements disposed therebetween are tilted in the longitudinal direction of the press. At the same time, the short stroke provides the required free space between every two filter elements as required for passage of the filter cloth after emptying. The tilting results in a significant improvement for the ejection of the filter cake. This is particularly applicable to filter presses in which the filter chamber required for the filtration process is formed by a plurality of elements as this is the case, for example, in frame filter presses in which a frame with slurry inlet is disposed between two plates provided with channeling and discharge channels or also in chamber filter presses in which the filter plates have, at least on one side, a dish-shaped recess so that contacting filter plates form a filter chamber.

In a further, particularly advantageous embodiment of the invention, the edge regions on facing areas of some of the filter elements are provided with protrusions on one side and corresponding recesses on the other side. These protrusions may, for example, be pins or projecting strips and, particularly in the above-described frame filter press, they serve the purpose of providing a form-locking connection in the closed state between the frame and the filter plates delimiting the frame so that the frame cannot be bent out to the side under the pressure of the incoming slurry. Due to the high closing forces, a relatively slight height is sufficient for the projections to absorb the generated transverse forces while the piece of filter cloth enclosed between a projection and the associated recess will not be excessively stressed or damaged.

In a filter press in which the filter elements are formed by a plate with discharge channeling on both sides and a frame with inner walls which are inclined toward the plane of the frame, according to an advantageous embodiment of the invention a tilting strip is provided which is placed in each frame along the inner wall parallel to the lower edge. The tilting strip is fastened by means of holding means, preferably a cloth, to the inner wall parallel to the upper edge. In the closed state, the tilting strip rests directly on the inclined inner wall and is held in its position by the adjacent filter plate. The cloth which is used as the preferred holding means has a coarse weave with as little adhesion as possible for the filter cake, for example a PTFE fabric. In the closed state the holding cloth rests directly on the filter cloth of the contacting filter plate on the other side. When the press is opened, and simultaneously, the upper edge of the frame is tilted in the direction toward the larger frame opening, the influence of the weight of the cake pulls taut the holding cloth in the direction toward the larger frame opening while at the same time the tilting strip is pushed over the lower edge of the larger frame opening. This avoids the baking of cake residues on the lower sealing face of the frame. If baking does occur, it will occur only on the tilting strip so that with the subsequent pushing together of the plate stack the lower sealing face of the frame will also be free.

In a preferred embodiment of the invention, both ends of the tilting strip are provided with a closing latch with which the tilting strip can be brought in a simple manner into position at the inner wall of the frame during the pushing together of the plate stack.

For filter presses with an especially high number of plates, a further embodiment of the invention provides that the plate stack is subdivided into at least two blocks of. The end of each block of stacks is provided with a delimiting plate and each delimiting plate on the side of a plate block facing away from the closing direction is provided with its own drive and supports the length equalization for the filter cloth drive means. The delimiting plate on the side of a plate block facing the closing device supports the drive motor for the filter cloth drive means and the delimiting plates immediately adjacent one another between two stack blocks are held in parallel alignment with one another by spacer means even in the open state. Due to the accordion effect produced by the spacer means, one closing device can open, for practical purposes, only a limited number of filter elements since otherwise the stroke to be handled by the closing device would be too large. A filter press according to the embodiment as detailed above has the advantage that very large filter presses can be assembled without requiring a large stroke for the closing device. This can be accomplished in that the delimiting plate of the plate block disposed on the side facing away from the closing device takes over, with respect to movement, the function of the head plate so that the adjacent plate block can be opened with the aid of the drive of such a delimiting plate while the preceding plate block is pushed together by the drive. Simultaneously, however, the length equalization arrangement for the stack block extending in the direction toward the closing device is disposed on the delimiting plate.

While it is possible, in principle, to associate each plate block with its own endless filter cloth, a particularly advantageous embodiment of the invention provides that the endless filter cloth is brought through the entire plate stack in a zigzag pattern and that a compensating device is disposed between the adjacent delimiting plates of two stack blocks. The filter cloth is guided over the compensating device in a length which is at least twice the height of a filter plate. This makes it possible to use only one filter cloth length even for large plate stacks which are divided into a plurality of stack blocks. With the aid of the compensating device it is then possible, when the stack block is open, to pull a length of filter cloth corresponding to the height of a filter plate through the stack block.

According to a further advantageous embodiment, the adjacent delimiting plates between two blocks comprise filter cloth washing devices. This makes it possible, even if a plurality of stack blocks are provided, to introduce a clean piece of filter cloth into the respective stack block during each opening process.

DESCRIPTION OF THE PREFERRED EMBODIMENTS

Figure 1:
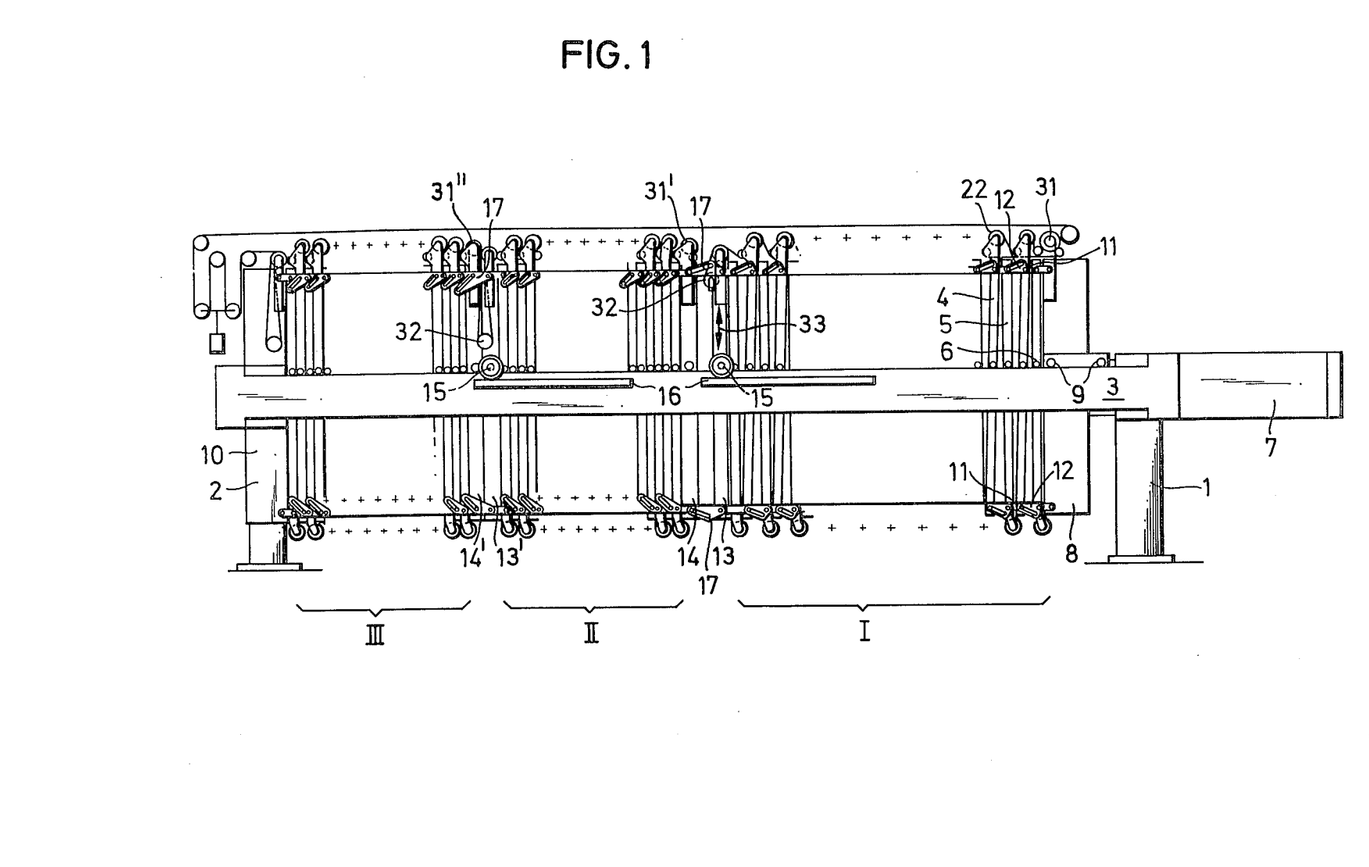
FIG. 1 is a side elevational view of a filter press according to a preferred embodiment of the invention.

FIG. 1 shows, in a side view, an embodiment of a filter press, partially in the open state. In this embodiment, two spaced parallel guide carriers 3 are mounted on uprights 1, 2. Between the two guide carriers 3, there are disposed filter elements 4, 5, which are supported on the guide carriers 3 by lateral pins or rollers 6. The configuration of the individual filter elements will be described in further detail below. The upright 1 is connected with a closing device 7 formed, for example, of a hydraulic piston/cylinder arrangement whose piston rod is connected with an end plate 8 displaceably supported by guide rollers 9 on the two longitudinal carriers. A head plate 10 serving as an abutment for the last filter element is connected with the upright 2.

The filter elements 4, 5 together form a plate stack which in the illustrated embodiment is subdivided into three stack blocks I, II, III. The individual filter elements are connected together in a chain-like manner by means of spacer elements 11, 12 whose design and function will be explained in further detail below with the aid of two embodiments. When the filter press is opened, the individual filter elements can be pulled apart or pushed together like an accordion.

The individual stock blocks are separated by delimiting plate 13, 14. The delimiting plate 13 disposed on the side of the stack block facing away from the closing device 7 is provided with its own drive formed, for example, of toothed gears 15 arranged at both sides of the delimiting plate 13. The toothed gears are in communication with a drive motor and roll off on a toothed rod 16 disposed at the longitudinal carriers 3. The delimiting plates 13, 14 are connected together by means of coupling members 17 whose design approximately corresponds to the spacer elements 12. The coupling members 17 are designed in such a manner that, when the plate stack is opened, the delimiting plates 13, 14 remain oriented parallel to one another.

Figure 2:
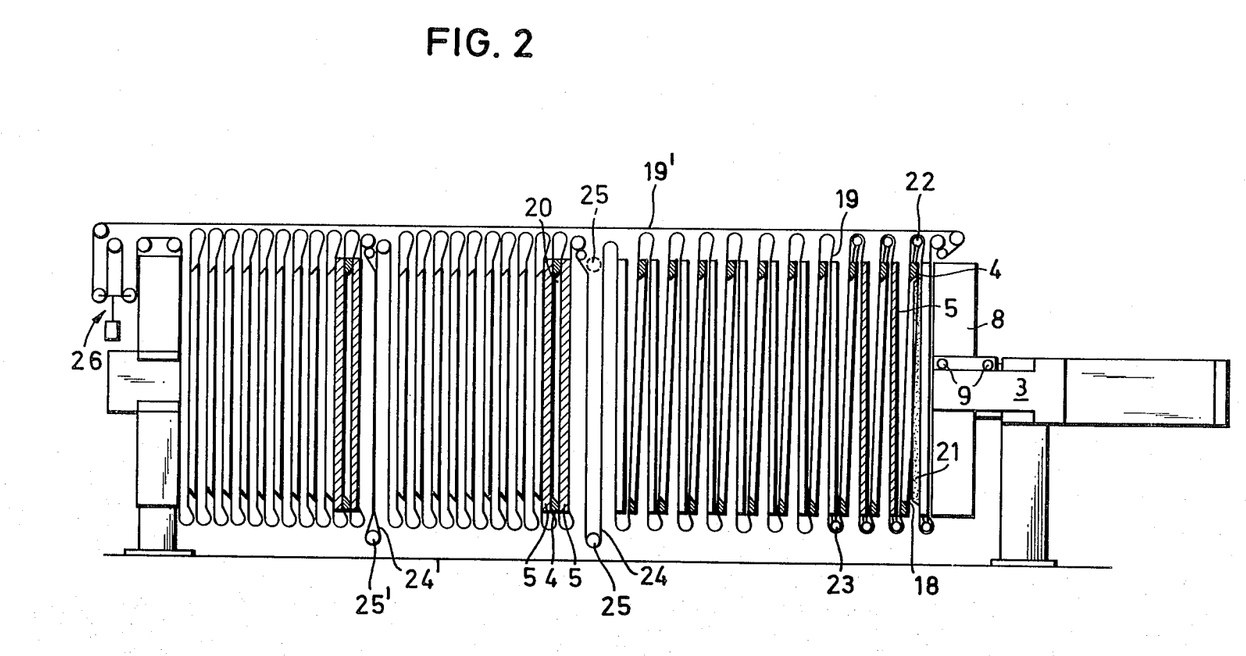
FIG. 2 is a sectional side elevational view of the structure of FIG. 1.
Figure 3:
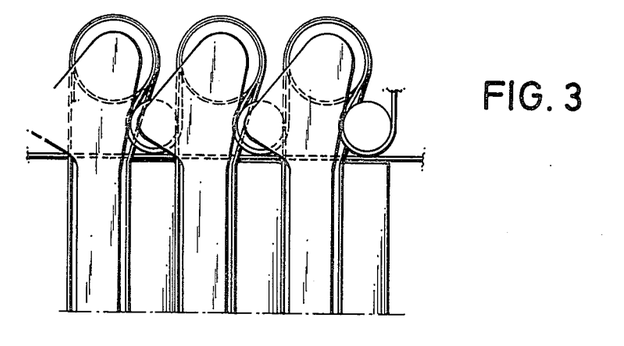
FIGS. 3 and 4 are side elevational views of a detail of the preferred embodiment in an open and in a closed position, respectively.

The sectional view of FIG. 2 shows that in this embodiment the plate stack is formed of two different filter frame-like filter elements 4 and plate-like filter elements which are provided on both faces with vertically downwardly oriented channeling. Each frame-shaped filter element 4 has inner walls 18 which are inclined with respect to the plane in which the element extends. An endless filter cloth 19 is guided in a zigzag pattern between all plates of the plate stack, its "idle portion" 19' extends above the plate stack. When the plate stack is closed, one frame-shaped filter element 4 with two flanking plate-like filter elements 5 form a filter chamber 20 which is covered with filter cloth at both sides with respect to the channeling in the plate-shaped filter element 5. The slurry inputs are arranged, in a known manner, at a frame-shaped filter element 4 while the filtrate discharge devices are provided, likewise in a known manner, at the plate-shaped filter elements 5.

Before the essential structural details are explained in further detail, the mode of operation of this filter press will be briefly explained in more detail with the aid of FIGS. 1 and 2:

After all filter elements of the plate stack are pushed together with the aid of the drives 15 and the delimiting plate 13 and with the aid of the closing device 7 with the intermediary of the end plate 8, to form a closed plate stack and are compressed with a given closing pressure with the aid of the closing device 7, the slurry to be filtered is introduced simultaneously into all filter chambers 20. The solids are retained by the filter cloth 10 while the filtrate flows out through the channeling in the plate-like filter elements 5 and is extracted by means of known extraction systems. A filter cake thus builds up in each filter chamber 20 from the retained solids so as to finally completely fill the filter chamber. After the supply of slurry has been stopped, the head plate 8 is retracted with the aid of the closing device 7. The individual filter elements are thus pulled apart like an accordion. Due to the fact that the spacer elements 11 are designed for a "short stroke", i.e. they leave only a small space between each two adjacent filter elements, while the spacer elements 12 permit a "large stroke", i.e. a broad distance between each two filter elements and, moreover, the sequence of the spacer elements in the upper row is arranged to be offset by one filter element with respect to those in the lower row, there result the positions of the individual filter elements as shown in FIGS. 1 and 2. The plate-shaped filter elements 5 thus remain vertically oriented while the frame-like filter elements 4 are tilted. In spite of a short opening groove there then results a relatively wide gap at the lower end through which the filter cake 21, indicated in FIG. 2, can drop out at the bottom.

The drive 15 for the delimiting plate 13 has held the remaining plate blocks II, III in the closed position. Since stack block I has now been emptied, the drive for the delimiting plate 13 opens the stack block II in the same manner, while stack block III is still held in the closed state by delimiting plate 13'. After emptying of the stack block II, finally, the stack block III is opened by the drive 15 of the delimiting plate 13' and is emptied in the same way.

As can be seen in FIG. 2, the individual filter elements are provided with guide rollers 22 (at the frame-shaped filter elements 4) and guide rollers 23 (at the plate-shaped filter elements 5) alternatingly at the top and bottom. The filter cloth 19 is guided through the entire plate stack in a zigzag pattern. The number of plates including the delimiting plates is selected in such a manner that the filter cloth is brought in two layers between each two delimiting plates 13, 14, and can be held by a compensating roller 25 disposed freely in the cloth loop 24 formed in this way. The distance between the delimiting plates 13, 14 in the open state is so dimensioned (by an appropriate design of the coupling elements 17) that the compensating roller can be moved freely through the space therebetween.

When the stack block is open, the arrangement described schematically above makes it possible, with the aid of a drive means to be described in detail below, to pull the filter cloth through the entire stack block by a length which corresponds to the height of one filter element. In the space between the delimiting plates 13, 14, the comensating roller 25 then moves into the position shown in dashed lines in the upper region of the delimiting plates. After the stack block I has been pushed together via the drive 15 of the delimiting plate 13 and the stack block II has been opened for emptying, the filter cloth can be pulled through the open stack block II in the same manner so that the compensating roller 25' of the cloth loop 24' moves upwardly while the cloth loop 24 and the compensating roller 25 moves downwardly between the stack blocks I and II. Finally, after emptying the stack block II, the filter cloth can be pulled through by a corresponding length. The cloth loops 24 now disposed between the delimiting plates can then each be subjected to a washing process. The washing device is disposed either outside the press or is formed by the two adjacent delimiting plates, in which case the delimiting plates are designed in the usual manner as washing devices. The thus resulting intermediate cleansing of the filter cloth results in an improvement of the filtering output. The length equalization of the filter cloth required for the opening and closing process is effected by means of a preferably weighted tensioning device 26 in the region of the end plate 10.

Figure 4:
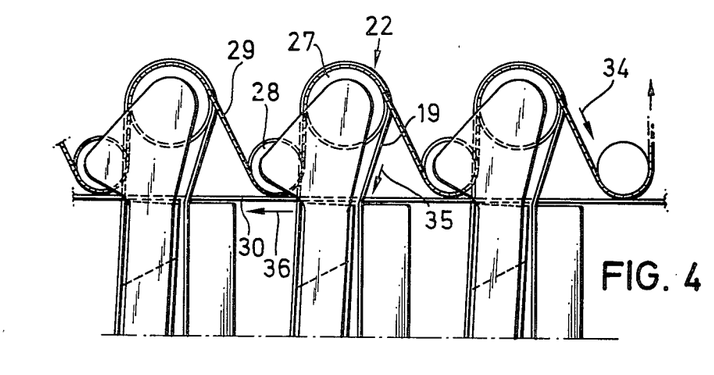
Figure 5:
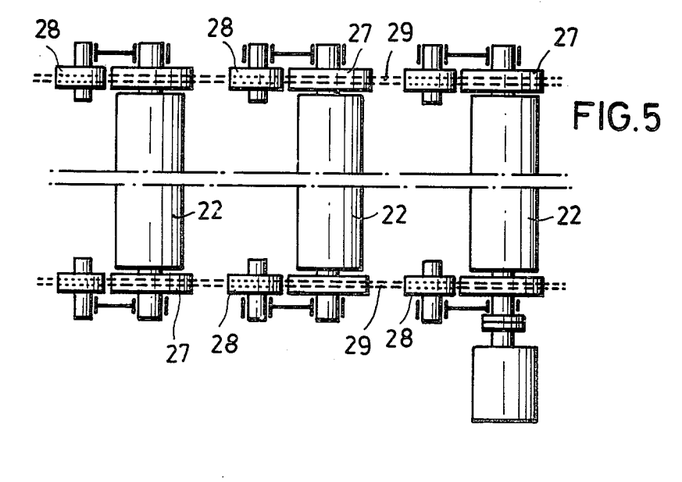
FIG. 5 is a top plan view of the structure of FIG. 4.

The drive for pulling through the filter cloth will be described in detail with the aid of FIGS. 1, 3, 4 and 5. As can be seen from the plan view of FIG. 5, each end of the guide rollers 22 has an associated gripper 27, such as a toothed wheel. As can be seen from the side view of FIG. 4, each gripper 27 is associated in axially parallel relationship with a guide wheel 28. The axis of each guide wheel is diposed somewhat below the axis of the gripper and projects on one side beyond the plane of the associated frame-shaped filter element 4. The mutual positions of the axes of gripper 27 and guide wheel 28 are so designed that, in the closed state of the plate stack (FIG. 3) each guide wheel 28 can slide by a certain degree under the gripper 27 of the adjacent plate. A drive means 29 is guided in a zigzag pattern as shown in FIG. 4 around the gripper gears 27 and the guide wheels 28. The drive means may be formed of a roller chain or the like; preferably, however, a toothed belt will be used. The toothed belt is an endless belt and is, with its working flight, trained about all grippers 27 of one stack block and returns, with its idle flight 30, underneath the grippers. As can be seen in FIG. 1, in the region of the end plate 8 the toothed belt is guided over a drive wheel 31 which is connected with a drive motor. At the delimiting plate 13 the toothed belt is guided over a guide wheel 32 which is mounted to be vertically displaceable on the delimiting pate 13 in the direction of the double arrow 33 so that here too the required length equalization is provided for the opening and closing process. The guide wheel 32 is connected with a tensioning means (not shown in detail) such as a weight, a spring or the like so that during closing of the stack block the slackened length of the idling reach of the toothed belt can be taken up.

The stack blocks II and III are designed in the same manner as the stack block I. Thus the drive motor for the drive gear 31' or 31", respectively, is mounted on each of the delimiting plates 14. While thus the filter cloth is brought through all blocks of the plate stack, each stack block has its own drive.

As soon as a stack block is opened, as shown in FIG. 4, the toothed belt 29 is pulled through in the direction of the arrow 34 by the drive wheel 31 so that the filter cloth supported on the guide rollers 22 is pulled through the open stack block in the direction of the arrow 35. The idling flight 30 of the belt 29 moves in the direction of arrow 36.

If now, after completion of the cloth transport, the filter plate element of the respective stack block are pushed together, the guide rollers 22 must no longer be rotated since, due to the accordion-type closing motion, part of the filter cloth has already been clamped between the plates so that rotation of the guide rollers during the pushing-together may cause undue tension in and possible damage to the filter cloth. Such an occurrence, however, is avoided in the embodiment of the drive described in connection with FIGS. 3, 4 and 5. If the filter elements are mved from the open position shown in FIG. 4 to the closed position shown in FIG. 3, the angle by which the portion of the toothed belt 29 disposed between the guide roller 22 encloses the guide wheel 28 and the gripper 27 of the adjacent filter element increases. With this "winding" and "unwinding", respectively, during opening it is avoided that during the closing or opening movement, respectively, the guide roller 22 are caused to rotate. During the closing movement, the idling flight 30 of the belt 29 is merely tensioned by the tensioning means 32 in the direction of the arrow 36.

Because of the fact that the frame-shaped filter elements 4 can tilt downwardly, the stroke required to open the plate stack can be limited to a minimum amount so that short-stroke closing units can be used even in large presses since the plate stack or the stack blocks, respectively, need be opened, in the area of the lower edges, only by an amount which is somewhat larger than the thickness of the frame-shaped filter elements. However, in case of filter cakes which tend to stick, when the filter cake slides out, solid residues may adhere to the sealing face of the frame-shaped filter element 4 so that during the subsequent closing process the respective filter chamber is not sealed tightly or the filter cloth engaging the sealing face is damaged. In order to assure proper cake discharge even with sticky products, without relinquishing the advantages of the short opening stroke, a special embodiment of the frame-shaped filter element 4 is illustrated in FIGS. 6, 7 and 8 and described in connection therewith.

Figure 6:
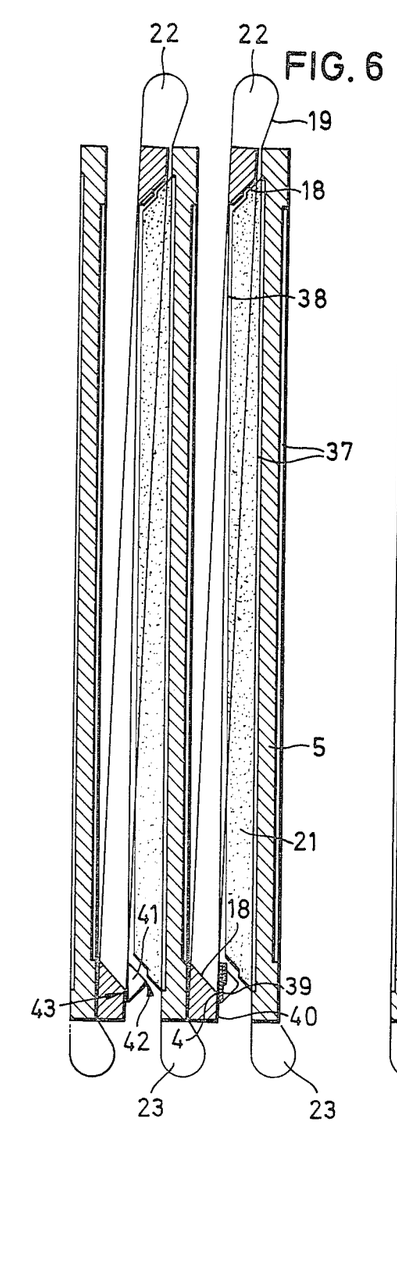
FIGS. 6 and 7 are sectional side elevational views of a preferred embodiment of a detail of the invention in an open and in a closed position, respectively.
Figures 7, 8:
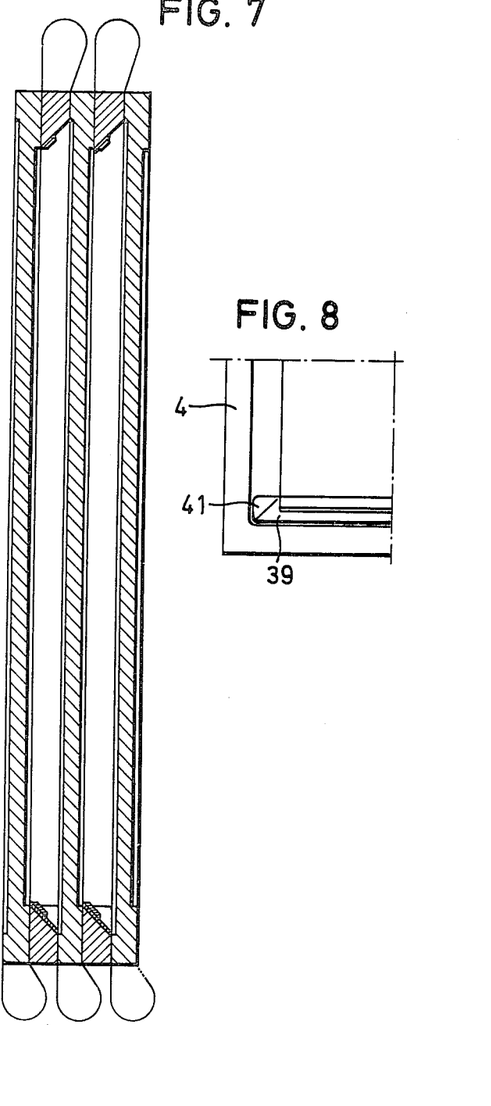
FIG. 8 is a top plan view of a detail of FIG. 6.

FIG. 6 shows a plurality of consecutive filter elements 4 and 5 on an enlarged scale. FIG. 6 clearly illustrates the channeling 37 on both sides of the plate-shaped filter elements 5. It can also be seen that the frame-shaped filter elements 4 have inner walls 18 which are inclined with respect to the plane of the filter element.

At frame 4, on the inner wall associated with the upper edge, there is provided a holding means comprising an open-weave cloth 38 which covers the smaller opening of the frame. At the lower end of the cloth 38 there is fastened a tilting strip 39 which extends over the entire width of the lower inner wall 18. The tilting strip is connected with the frame-shaped filter element only by means of the cloth 38 and is connected with the cloth 38 only at its side facing the smaller opening of the frame 4. If after completion of the filtering process, the plate stack is pulled apart, the weight of the adhering filter cake 21 tensions the cloth 38 so that the tilting strip 39 can slide out downwardly through the broad gap between the filter elements 4 and 5. The tilting strip 39 thus covers particularly that region of the sealing surface 40 of the frame-shaped filter element 4 where the risks of baking-on are especially high.

The tilting strip 39 is bent up at both its ends so that a closing latch 41 is formed. The tip 42 of the closing latch 41 must be arranged so that it lies higher than the edge 43 of the inner wall 28 of the frame-shaped filter element so that when the filter elements are brought together the plate 5 disposed in front of the tilting strip will cause the tilting strip 39 to be pushed into the frame opening as this is shown in the sectional view of FIG. 7.

FIG. 8 shows a top view of a lower corner of a frame-shaped filter element 4 in which the tilting strip 39 and its closing latch 41 can be seen in the inserted state, that is, in the position according to FIG. 7.

Figure 9:
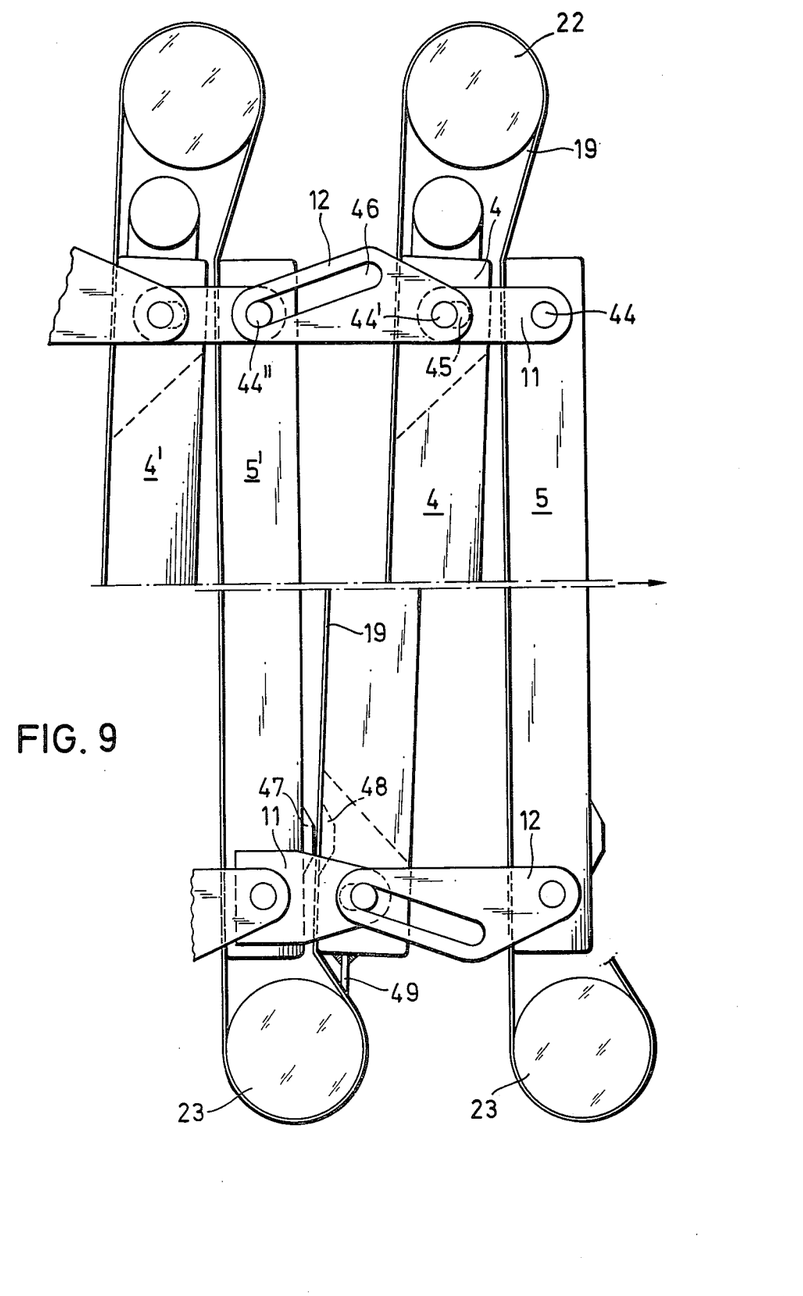
FIGS. 9 and 10 are side elevational views of a preferred embodiment of a detail of the invention in an open and in a closed position, respectively.
Figure 10:
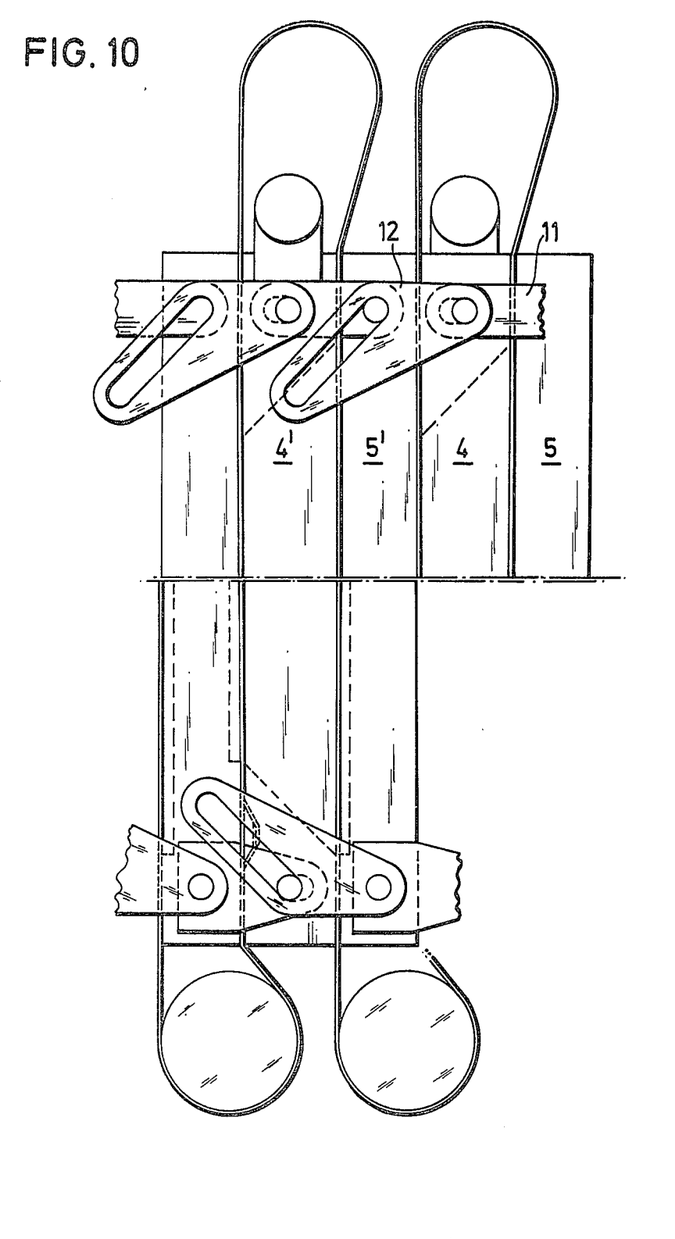

FIGS. 9 and 10 illustrate, in a separated and in a pushed-together state, respectively, a further embodiment of the invention, comprising with spacer elements which connect the filter elements together in a chain-like manner. The spacer elements comprise links 11 with short stroke and links 12 with long stroke connected alternatingly end-to-end to form series at the top and at the bottom of the filter element stack, at both sides thereof. On each filter element bolts are mounted to which the links are articulated. Each link 11 is provided with a circular opening through which the bolt 44 of the filter element 5 passes and an elongated opening 45 through which the bolt 44' of the adjacent filter element 4 passes. The link 12 has an approximately triangular shape and is likewise provided at one end with a circular bore through which the bolt 44' of filter element 4 passes and an elongated opening 46 whose length approximately corresponds to the desired opening width between the filter element 4 and the next following filter element 5'. Through the opeing 46 passes on bolt 44" of the filter element 5'.

At the lower edge of the plate stack there is also provided a corresponding row of spacer elements which, however, have a sequence which is offset with respect to the upper row. Filter element 5, which has a spacer element with short stroke at its upper end, that is a link 11, has a spacer element with long stroke, that is, a link 12, at its lower end, while the connection between filter element 4 and the next following filter element 5' at the lower end is effected by a short-stroke link 11. This results in the desired oblique orientation of the frame-shaped filter element 4 when in the open state, as shown in FIG. 9.

FIGS. 9 and 10 also show an exemplary arrangement of the inlet pipes for the slurry which are connected with the frame-shaped filter elements 4 and which open, with the intermediary of a corresponding channel, into the filter chamber 20 defined by the frame-shaped filter element 4. The other ends of the inlet pipes are connected to a slurry supply conduit. In other embodiments, the slurry is introduced from the side, preferably in the upper region, through lateral projections mounted on the plates 5 and frames 4. The projections have bores which in the closed state of the plate stack form a closed inlet channel.

FIGS. 9 and 10 show a filter element embodiment which in the closed states prevents the frames from bending outwardly under the influence of the pressure building up in the liquid in the filter chamber 20. For this purpose, the edge regions of the plate-shaped filter elements 5 are provided with projections 47 which have associated with them corresponding recesses 48 in the frame-shaped filter elements 4. The recesses 48 are so dimensioned that in the pushed-together state, as shown in FIG. 10, the filter cloth 19 extending over the recess can also be accommodated. As shown, the projections 47 may be conical lugs distributed in a spaced arrangement along the periphery of the respective filter 5, and the recesses 48 provided in the filter elements 4 are accordingly cone-shaped. As an alternative, the projections may be continuous or interrupted strip-shaped elements. If the plate stack is pushed together, as shown in FIG. 10, the frame-shaped filter element 4 is held in a form-locking manner against forces parallel to the plane of the plate by the adjacent plate-shaped filter element 5, thus avoiding bulging.

Since there is practically no change in the deflection of the filter cloth 19 in the area of the lower guide rollers 23 in the open and in the closed state, strippers or scrapers 49 may be disposed at the lower frontal faces of the plate-shaped filter elements 4. The strippes 49 are oriented in an oblique direction during opening for removing residues of filter cake adhering to the filter cloth as the latter is being pulled through.

Figure 11:
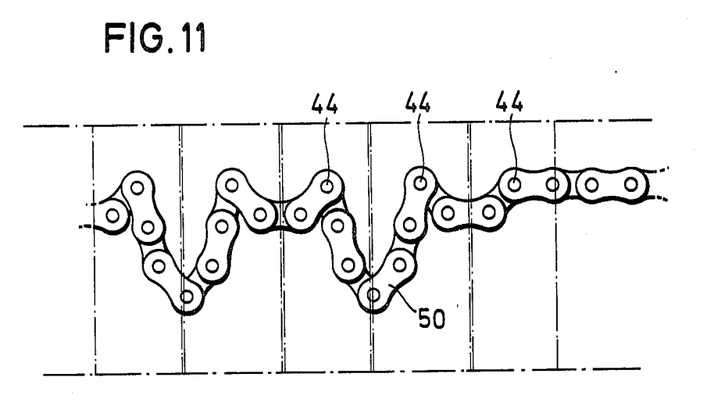
FIGS. 11 and 12 are schematic sectional elevational views of another preferred embodiment of a detail of the invention in an open and in a closed position, resepctively.
Figure 12:
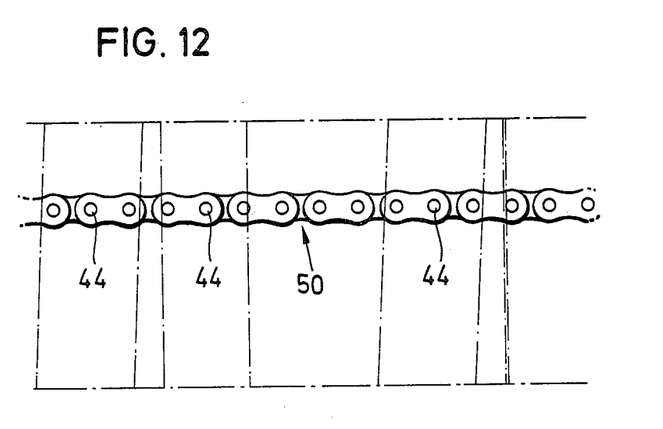

FIGS. 11 and 12 show another embodiment of the spacer elements, in the closed and open state, respectively. The spacer elements are here formed of a continuous Fleyer (roller) chain which is connected by pins 44 with the individual consecutive filter elements. In order to realize the desired alternation of short stroke and long stroke, the division of the chain is selected such that alternatingly three or six chain links, respectively, are situated between successive bolts 44. Here too, the sequence of short-stroke spacer elements and long-stroke spacer elements is offset between the upper and lower row of one side, as explained in connection with the embodiment of FIGS. 9, 10.

The run-through of the filter cloth is effected in the same manner as in the embodiment described in connection with FIGS. 9 and 10.

It is to be understood that, the invention is not limited to the described embodiment of a frame filter press. Thus, the proposed solution for the filter cloth drive and the blockwise opening and closing of the plate stack can be used in the same manner for filter presses in which the filter elements are so-called chamber filter plates, that is, the filter plates are planar on one side but are provided with cup or dish-like depressions on the other side which then, in the closed state, together with the planar face of the preceding filter plate, form the filter chamber. For this type of press it is also advisable to arrange the spacer elements in such a way that during opening, the plates are brought into an oblique position. The difference is only in that all successive spacer elements of one plate stack or one stack block, respectively, have the same stroke, that merely the coupling of the first plate to the head plate and of the last plate to the final delimiting plate or the end plate, respectively, is effected in such a manner tha the oblique orientation results when the filter elements are pulled apart. The chamber plates may be conventional diaphragm chamber plates wherein the dish-like depression on the one side of the filter plate forming the filter chamber is lined by an elastic diaphragm. When the reverse side of the diaphragm is pressurized the filter cake formed in the filter chamber is compressed.

The smooth side of the filter plate may of course also be provided with a diaphragm, which will be used with preference, if the starting chamber depth (frame thickness) cannot be enlarged for technical reasons.

The invention is furthermore not limited to the described, particularly advantageous short-stroke opening system which is effected by the block-wise opening and closing of a long filter plate stack. Instead of the block-wise opening and closing, the closing device may be mounted on a transverse yoke which is displaceable on longitudinal carriers 3 together with the head plate 8 by means of its own drive so that even longer presses can be operated with a short-stroke closing device. In such an embodiment, after discontinuing the application of the closing pressure, the entire plate stack is opened in an accordion fashion by moving the transverse yoke and, after emptying, performing the washing process and pulling through the filter cloth, the plate stack is closed in the same manner by moving the transverse yoke. After closing, the transverse yoke is immobilized on the longitudinal carriers 3 by means of a separate locking device and then the closing device is charged with the necessary closing pressure which is transmitted to the longitudinal carriers by the locking device of the transverse yoke. The structural length of such a filter press, however, is greater than in the described embodiment with blockwise opening and closing of the plate stack. The advantage of the last described embodiment, however, is that here too, closing devices, particularly hydraulic cylinders, with short stroke can be used.

Figure 13:
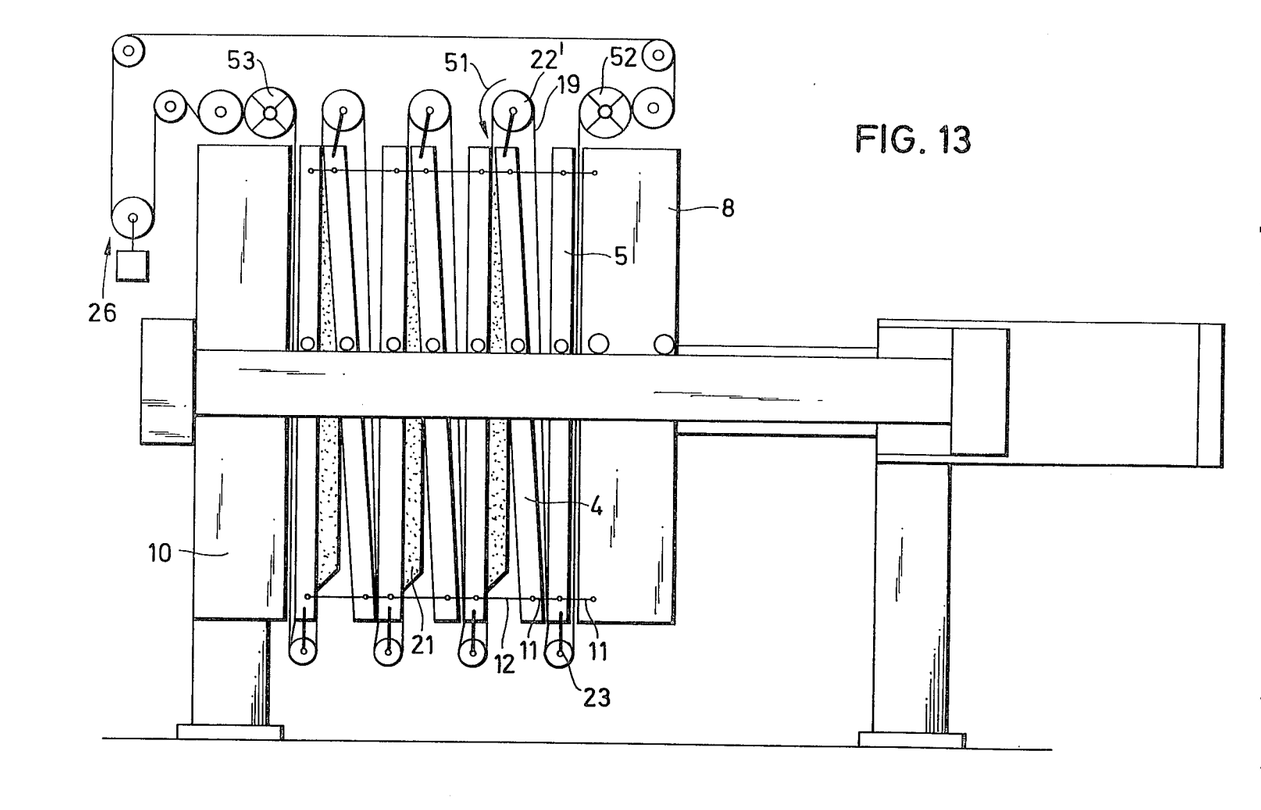
FIG. 13 is a schematic side elevational view of a filter press according to a further preferred embodiment of the invention.

In the embodiment of a filter press shown only schematically in FIG. 13, the association of the individual filter elements 4, 5 with the movable end piece 8 is different than in the case of the embodiment according to FIGS. 1, 2. Such an arrangement is advisable, in particular, when the products to be filtered out tend to stick together or to adhere to the frame-shaped filter element 4. Accordingly, the plate stack is so designed that the plate-shaped filter element 5 which is connected directly with the end piece 8 by a short spacer element 11 is followed by a frame-shaped filter element 4 whose larger frame opening is oriented toward the head piece 10. It follows that the sequence of the successive spacer elements with short and long strokes is different than in the embodiment according to FIG. 1. Accordingly, in the upper row, the frame-shaped filter element 4 is connected, by long-stroke spacer element 12, with the plate-shaped filter element 5 which is connected directly with the end piece 8. In the lower row, the same frame-shaped filter element 4 is connected by a short-stroke spacer element 11. All subsequent filter elements are then connected together alternatingly by long-stroke and short-stroke spacer elements, as indicated schematically in FIG. 13. In this embodiment, for example, the Fleyer (roller) chains shown in FIGS. 11 and 12 may serve as the spacer elements.

In the embodiment shown in FIG. 13, the guide rollers 22' which are connected with the frame-shaped filter element 4 have a diameter which is preferably substantially greater than the frame thickness. The mounting of the guide rollers 22' is so situated with respect to the center plane of the frame-shaped filter element 4 that the excess of the roller diameter is essentially disposed on that side of the frame-shaped filter element which has the smaller filter surface.

The FIG. 13 embodiment of the filter press according to the invention has the advantage that during the opening process the frame-shaped filter elements 4 are lifted in succession off the filter cake and thus its release from the frame occurs in parts and successively, rather than simultaneously over the entire peripheral surface. The guide roller 22' each time tensions in the opening direction the filter cloth moving through the opening gap between each two filter elements so that the filter cloth together with the filter cake is lifted away from the contact surface. As indicated in FIG. 13, in case of sticky products it can be assumed that the filter cake will adhere substantially to that part of the filter cloth which contacts the plate-shaped filter element so that during the subsequent pulling through of the filter cloth while the plate stack or stack block is open, the filter cake is stripped from the filter cloth passing through in the direction of arrow 51 by means of scrapers (not shown in detail) which are associated with the lower guide rollers 23.

Since in the arrangement of FIG. 13 the weight of the adhering filter cake stresses the piece of cloth which is pulled through downwardly, that is, the weight of the filter cake is effective in the transporting direction, care must be taken that inadvertent movement of the filter cloth, due, for example, to insufficient initial tension, is avoided. For this purpose the filter cloth is guided at both sides of the plate stack or one stack block, as the case may be, over respective brake rollers 52 or 53, respectively, which are provided with a releasable braking means. The braking means is coupled to the drive motor 31 in such a manner that the brake is released when the drive motor is switched on. If a hydraulic motor is used, the release can be effected hydraulically, that is, at the moment at which the hydraulic motor is pressurized, the operating pressure for the brake is released by a corresponding branch line. Depending on the type of motor employed, a brake can be controlled mechanically or electrically.

It will be understood that the above description of the present invention is susceptible to various modifications, changes and adaptations, and the same are intended to be comprehended within the meaning and range of equivalents of the appended claims.

I claim:

1. In a filter press including a press stand having a length dimension; a plurality of plate-like filter elements and frame-like filter elements oriented perpendicularly to said length dimension and arranged alternatingly and supported in said stand for displacement parallel to said length dimension and relative to one another; a closing device operatively connected to the filter elements for pressing the filter elements to one another into a filter element stack; a guide roller supported on each filter element at opposite sides thereof as viewed in said length dimension; each said guide roller having a horizontal axis of rotation oriented perpendicularly to said length dimension; a continuous filter cloth trained about each said guide roller for guiding said filter cloth in a zigzag course between all adjoining filter elements; at least some of said guide roller being driven guide rollers rotated by driving means for pulling said filter cloth through said filter elements in said zigzag course; the improvement in said driving means comprising (a) a sprocket drivingly connected with each said driven guide roller and having a rotary axis in alignment with the rotary axis of the respective driven guide roller;

(b) a guide wheel mounted on each filter element which supports a driven guide roller; each guide wheel having a rotary axis extending parallel with the rotary axis of the respective sprocket and spaced therefrom in a direction which forms an angle other than zero with the direction of said length dimension;

(c) an endless flexible drive member meshing in succession with each said sprocket and being deflected by respective said guide wheels between every adjoining sprocket, whereby said flexible drive member has a zigzag course and is trained about each said sprocket in the same direction; and (d) motor means for driving said flexible drive member to unidirectionally rotate said guide rollers.

2. A filter press as defined in claim 1, wherein said filter elements are flanked by a head plate supporting said closing device and an end plate; further wherein said motor means is mounted on one of said plates; further comprising an additional guide wheel about which said flexible drive member is trained; means for displaceably mounting said additional guide wheel on said head plate; and tensioning means for biasing said additional guide wheel for taking up any slack of said flexible drive member.

3. A filter press as defined in claim 1, further comprising a first series of end-to-end interconnected, alternating long-stroke and short-stroke spacer elements; said first series extending parallel to said length dimension along said filter elements at an upper zone thereof; each spacer element of said first series having a first end articulated to a plate-like filter element and a second end articulated to an adjoining frame-like filter element; further comprising a second series of end-to-end interconnected, alternating long-stroke and short-stroke spacer elements; said second series extending parallel to said length dimension along said filter elements at a bottom zone thereof; each spacer element of said second series having a first end articulated to a plate-like filter element and a second end articulated to an adjoining frame-like filter element; each said long-stroke spacer element having means permitting a relatively large shift between the plate-like filter element and the adjoining frame-like filter element interconnected by the respective long-stroke spacer element; each said short-stroke spacer element having means permitting a relatively small shift between the plate-like filter element and the adjoining frame-like filter element interconnected by the respective short-stroke spacer element; each said filter element being connected to an adjoining, same filter element by a long-stroke spacer element of one of said series and a short-stroke spacer element of the other of said series, whereby in an open, spaced-apart position of said filter elements each said frame-like filter element assumes an inclined position to the vertical for facilitating removal of a filter cake therefrom.

4. A filter press as defined in claim 1, further comprising a projection and a complemental depression provided in an edge zone of at least some of adjoining said filter elements; in a closed state of the filter press each said projection on one filter element nesting in said depression of an adjoining filter element for preventing bending of the respective said plate-like filter elements during filtering operation.

5. A filter press as defined in claim 1, wherein each frame-shaped filter element has sloping wall faces along top, bottom and lateral marginal zones; the improvement further comprising a tilting strip attached at the wall face extending along the bottom marginal zone of each frame-shaped filter element and holding means connecting said tilting strip to a top part of the respective frame-shaped filter element, whereby in a closed state of the filter press the tilting strips lie flat on the wall face at the bottom marginal zone of the respective frame-shaped filter elements and in an open state of the filter press the tilting strips assume an inclined position relative to the wall face at the bottom marginal zone of the respective frame-shaped filter elements.

6. A filter press as defined in claim 5, further comprising a closing latch arranged at ends of each said tilting strip; the closing latches cooperating with an adjoining said plate-shaped filter element to tilt said tilting strip onto the respective said wall face upon closing the filter press.

7. A filter press as defined in claim 1, wherein said filter elements are divided into at least two filter element blocks; each filter element block being flanked by two delimiting plates; each said filter element block being provided with a separate said driving means for pulling said filter cloth.

8. A filter press as defined in claim 7, wherein each said drive motor is mounted on a delimiting plate situated at that side of the respective filter element block which is oriented towards said closing device.

9. A filter press as defined in claim 8, wherein each said separate driving means includes an additional guide wheel about which said flexible drive member is trained; means for displaceably mounting the additional guide wheel on a delimiting plate situated at that side of the respective filter element block which is oriented towards said closing device; and tensioning means for biasing the respective said additional guide wheel for taking up any slack of the respective flexible drive member.

10. A filter press as defined in claim 7, further comprising additional separate drive means associated with each said filter element block; each said additional drive means including a drive motor for propelling a delimiting plate situated at that side of the respective filter element block which is oriented away from said closing device.

11. A filter press as defined in claim 7, further comprising spacer means interconnecting adjoining delimiting plates belonging to different filter element blocks; said spacer means maintaining said adjoining delimiting plates parallel to one another.

12. A filter press as defined in claim 7, further comprising a compensating device disposed between adjoining filter element blocks; said filter cloth being guided over each said compensating device over a length equalling at least twice the vertically measured height of said filter elements.

13. A filter press as defined in claim 7, further comprising a filter cloth washing device mounted on adjacent delimiting plates between each two said filter element blocks.

* * * * *